J. SCHLATTER.
DEVICE FOR PRODUCING HOT AIR.
APPLICATION FILED NOV. 29, 1918.
1,301,324. Patented Apr. 22, 1919.
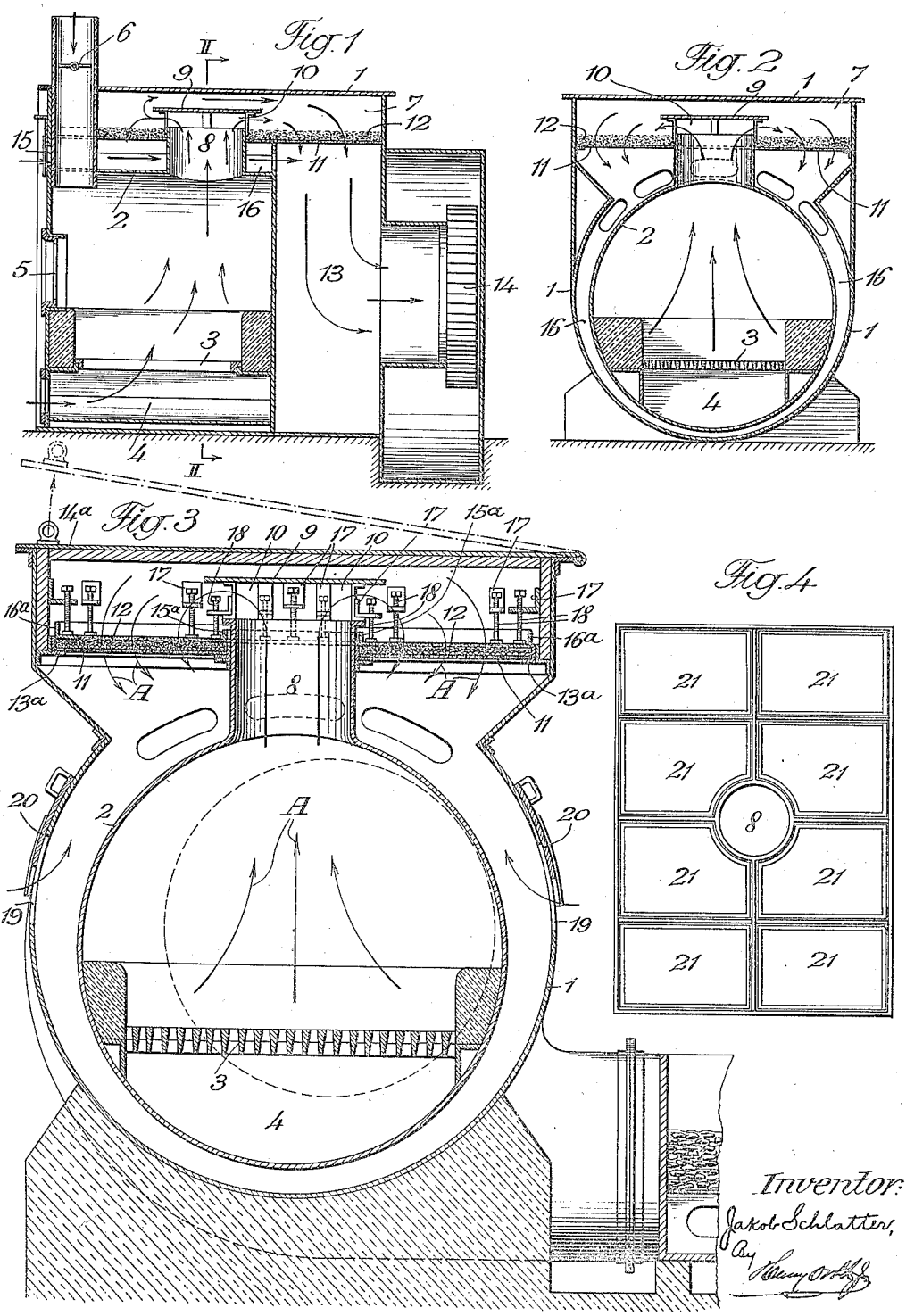

UNITED STATES PATENT OFFICE.

JAKOB SCHLATTER, OF ZURICH, SWITZERLAND, ASSIGNOR TO SCHLATTER FRORATH & CO., OF ZURICH, SWITZERLAND.

DEVICE FOR PRODUCING HOT AIR.

1,301,324.     Specification of Letters Patent.     Patented Apr. 22, 1919.

Application filed November 29, 1918. Serial No. 264,725.

*To all whom it may concern:*

Be it known that I, JAKOB SCHLATTER, a citizen of the Republic of Switzerland, residing at Zurich, Baumgasse 10, Switzerland, have invented new and useful Improvements in Devices for Producing Hot Air; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to a device for producing hot air adapted to be used, for instance, in drying installations for such products that have to be subjected to preliminary drying and to final drying at given temperatures. These products include fruits, vegetables, cosmetic and chemical products, sensitive dyes, etc., for which a drying process at given temperatures or within given limits of temperature is a necessary condition.

Devices for producing hot air are already known in which a mixture of flue gases and fresh air produced in a furnace is caused to pass previous to its entering into the installation where the dry air is to be used through at least one strainer, wire gauze or a similar metallic surface acting as a flue dust- and soot-catcher. Such devices have, however, the drawback, that the flue dust and the soot contained in the mixture are not wholly caught up by the wire gauze, strainer or the like, so that a part of the dust and soot is conveyed to the drying installation where they act in a very detrimental manner upon the products to be dried. In such devices the wire gauzes, the strainers or the like are moreover soon clogged by the flue dust which reduces to a considerable amount the quantity of air passing through the dust- and soot-catcher. A further disadvantage of said devices proposed hitherto consists in that the wire gauze, strainer or the like is very soon destroyed by the hot flue gases coming in contact therewith.

The object of the present invention is to provide a device for producing hot air comprising a fan drawing the hot gases generated in a furnace through at least one filter chamber in which said hot gases are at first backed up and then caused to pass through at least one layer of a filtering material adapted to catch up the flue dust and soot, whereby the bottom of said filter is continuously cooled by the fresh air streaming underneath the filter past the latter into a mixing chamber. The filter chamber is provided preferably within the upper portion of the furnace and the filter consists of one or more horizontally arranged layers of filtering material. When requisite, the filter may be subdivided into a plurality of cells, and the layer or layers respectively of the filter may consist of refractory material put on a bottom or support permeable to gas. In some cases it is advantageous to provide in connection with the filter adjustable pressure members in order to press the filtering material near the edges of the filter tightly against the adjacent walls of the furnace.

The invention consists also in the particular construction, arrangement, and combination of parts as will hereinafter be fully set forth, and pointed out in the claims, reference being had to the accompanying drawings, in which:

Figure 1 is a vertical longitudinal section through a first construction according to this invention;

Fig. 2 is a cross-section on the line II—II of Fig. 1;

Fig. 3 is a similar cross-section drawn on an enlarged scale through a second embodiment of the invention, and Fig. 4 shows diagrammatically a device comprising a filter chamber subdivided into a plurality of cells.

Referring at first to Figs. 1 and 2, 1 denotes a cylindrical jacket surrounding a furnace for producing hot air. This furnace has a cylindrical casing 2, a grate 3 and an ash pit 4. 5 designates the fire door of the furnace and 6 a pivoted valve by means of which admission of air from the top into the interior of the furnace can be regulated.

In the interior of the upper portion of the furnace jacket 1 is provided the filter chamber 7 communicating with the interior of the cylindrical casing 2 by means of a short conduit 8 of annular cross-section. Opposite the outlet opening of said conduit 8 is provided a baffle plate 9. Between the latter and the conduit 8 is provided a wall having apertures 10. The lower part of the filter chamber 7 is formed by a horizontal bottom 11 permeable to gas and consisting of perforated sheet iron or wire gauze or the like. On this bottom 11 is put for instance a layer of small pieces of fire bricks (chamotte) obtained by breaking fire bricks to small pieces having a diameter of about 10 to 15 millimeters. On this layer of fire bricks is put a second layer of such pieces having however a diameter of only about 4 to 8 millimeters. When requisite, a further layer of dust of fire bricks may be put on said second layer of small pieces of fire bricks. Better results are obtained, however, by laying on the uppermost layer of fire brick pieces a layer of about one centimeter thickness of asbestos fabric or asbestos wool. The fire bricks broken to small pieces (also other refractory materials may be used when requisite) have a rough surface on which the fibers of asbestos cling easily and which provides for an intimate connection of the different layers of the filter, so that the latter are not loosened or shifted relatively to one another when the hot gases pass through the filter. Thus any formation of apertures in the filter which would provide for a direct passage of the gases through it, is prevented.

The filter chamber 7 communicates through the layers 12 with a mixing chamber 13, while for the rest it is closed on all sides. Laterally of the mixing chamber 13 is provided a fan 14 and it communicates with the atmosphere by means of apertures controlled by slides 15 and an annular conduit 16.

The operation of the device described is as follows: The hot flue gases produced in the furnace are drawn by the fan 14 through the conduit 8 and the apertures 10 into the filter chamber 7 where they accumulate or back up in front of the filtrating layers 12. The gases are thus subjected in front of the filter proper to a certain pressure in the upper portion of the chamber 7 where the temperature rises up to 700° and even 1000°-1200° C. The flue gases are then caused to pass from the upper portion of the chamber 7 downward through the different filtrating layers 12 which catch up the flue dust, the soot and other only partially burnt particles which may be contained in said gases. The latter pass hereupon into the mixing chamber 13 and from the latter into the fan 14. The flue gases mix in the chamber 13 with fresh air passing throuugh the conduit 16 in which it is preheated. Said fresh air cools the bottom 11 while it passes from the left to the right through the upper portion of the furnace into the mixing chamber, so that said bottom is not destroyed by the red heat temperature existing in the upper portion of the chamber 7. In consequence of this, any sagging of the bottom 11 is prevented, so that the filtering-mass resting thereon does not change its position and formation of cracks and openings in said mass is prevented.

Analyses of the gases passed through the filtrating layers 12 have given the surprising result that said gases do not only contain any soot and flue dust, but also only a small percentage of carbon monoxid, a very small quantity of sulfurous acid and no sulfuric anhydrid. This proves, that the filtrating layers 12 do not only act as a mechanical means for catching up the flue dust and soot, but are also adapted to bring about some chemical reactions. These reactions are a consequence of the heating of the filtrating mass due to the backing up of the furnace gases in front of said mass causing a heating of the filtrating layers up to 1000°-1200° C. The highly heated filtrating mass acts then as a contact mass effecting a disassociation of the water vapor $H_2O$ into $H_2+O$. The oxygen thus set free is then very active and brings about certain very important chemical reactions. Thus, all the carbon, i. e. the soot, contained in the flue gases is wholly burnt, the carbon monoxid combines with the oxygen set free to $CO_2$. It has also been found, that the oxygen set free acts in such a manner upon the filtrating mass and gases that carbonates, such as $Al_2(CO_3)_3$, $CaCO_3$, $MgCO_3$, etc. and sulfates, such as $CaSO_4$, $MgSO_4$, $FeSO_4$; $Fe_2(SO_4)_3$, $Al_2(SO_4)_3$ are formed.

The possibility of regulating the temperature within the filter chamber 7 in the manner above mentioned renders the device more fire proof, as any sudden, great and consequently dangerous increase of temperature is prevented.

In the construction of the invention illustrated in Fig. 3, where the parts 1–11 correspond substantially to the parts designated with the same reference number of the first described embodiment, the bottom 11 is mounted on a frame 13 supported by the jacket 1. $14^a$ denotes a pivotally mounted cover for the filter chamber 7. $15^a$ and $16^a$ are rails having an L-shaped cross-section. These rails are arranged so that the rails $16^a$ are flush with the outer circumference of the layers 12 of the filter, while the rails $15^a$ are flush with the inner circumference of said layers 12. 17 are angle-irons fixed to the inner wall of the chamber 7 and to the outer wall of the pieces provided with the apertures 10 respectively. Said angle-irons 17 act as supports for screw-threaded bolts 18 provided on their lower end with a pressure head resting on a rail $15^a$ or $16^a$ respectively. 19 designates apertures which are for admitting fresh air and which can be covered to any desired amount by means of adjustable slides 20.

Upon a tightening of the screw threaded bolts 18, the rails $15^a$, $16^a$ are pressed against the upper layer of the filter which is then pressed tightly against the walls of the frame 13ª. As a result of this, any air passages still present between the layers of the filter and the frame 13ª and which would admit a passage of the flue gases, are filled out. Consequently, all flue gases streaming in the direction of the arrows A are caused to pass through the layers 12 of the filter.

As illustrated diagrammatically in Fig. 4, the filter can be subdivided into a plurality of cells 21. In connection with each such cell a separate pressure device may be provided, so that the material of the filter of each single cell can be pressed together to the required amount independently of the material of the other cells.

In a device for producing hot air designed according to this invention, the following advantages are obtained besides those already mentioned: In such a device not the whole mixture of flue gases and fresh air is purified, but only the flue gases. As a result of this, the size of the filter can be chosen relatively small. Owing to the very high temperature present within the filter chamber and the better combustion obtained, the hot air produced in the new device contains fewer noxious gases than the hot air produced in the devices proposed hitherto; this is of considerable importance in several respects. A further advantage of the device according to this invention consists in that the flue gases are caused to pass downward through the filter, so that they tend to press its layers toward the bottom 11, keeping thereby the layers of the filter together and preventing a formation of holes therein.

Having thus described my invention, what I claim as new, and desire to secure by Letters Patent, is:

1. A device for producing hot air, comprising a furnace for heating air, a fan arranged next to said furnace, a chamber, and means contained in said chamber acting as a filter for the flue dust and soot contained in the flue gases produced in the furnace, said chamber being arranged so that the flue gases are caused to pass downward through the filtering means contained in said chamber before they are drawn into the fan and that said gases backing up in front of the filtering means cause a great increase of temperature in said chamber and highly heat the filtering means.

2. A device for producing hot air, comprising a furnace for heating air, a fan arranged next to said furnace, a chamber provided in the upper portion of the furnace, filtering means contained in said chamber, and a conduit connecting the combustion space of the furnace to said chamber, the flue gases produced in the furnace being drawn by the fan at first into the upper portion of said chamber, where they back up, then downward through the filtering means and finally into the fan itself, the backed up gases causing a great increase of temperature in said chamber and heating the filtering means to a high degree.

3. A device for producing hot air, comprising a furnace for heating air, a fan arranged next to said furnace, a chamber provided in the upper portion of said furnace, a metallic member permeable to gas forming the bottom of said chamber, filtering means in horizontal layers on said bottom, a conduit connecting the combustion space of the furnace to said chamber containing the filtering means, a mixing chamber provided between the bottom of the filter chamber and the fan, and conduits connecting said mixing chamber with the atmosphere, the flue gases produced in the furnace being drawn by the fan at first into the upper portion of the filter chamber where they back up before the filtering means, then downward through the filtering means into the mixing chamber and finally into the fan itself.

4. A device for producing hot air, comprising a furnace for heating air, a fan arranged next to said furnace, a filter chamber provided in the upper portion of said furnace, a metallic member permeable to gas forming the bottom of said chamber, filtering means in horizontal layers on said bottom, a conduit connecting the combustion space of the furnace to said filter chamber, a mixing chamber provided between the bottom of the filter chamber and the fan, and means for supplying fresh air to the mixing chamber so arranged that the supplied air cools said bottom of the filter chamber, the gases produced in the furnace being drawn by the fan at first into the upper portion of the filter chamber where they back up before the filtering means, then downward through the filtering means into the mixing chamber and finally into the fan itself.

5. A device for producing hot air, comprising a furnace for heating air, a fan arranged next to said furnace, a chamber having a bottom permeable to gas, a conduit connecting the combustion space of the furnace with said chamber, pieces of porous refractory material of different size on said bottom acting as a filter for the flue dust and soot contained in the flue gases produced in the furnace, said chamber being so arranged that the flue gases pass downward through the refractory substance before they are drawn into the fan and back up in front of the filtering means thereby causing a great increase of temperature in said chamber and highly heating the filtering means.

6. A device for producing hot air, comprising a furnace for heating air, a fan arranged next to said furnace, a chamber having a bottom permeable to gas, a conduit effecting a communication between the combustion space of the furnace and said chamber, layers of small brick pieces of different size on said bottom and a layer of asbestos on said brick pieces, the layers of brick pieces and asbestos acting as a filter for the flue dust and soot contained in the flue gases produced in the furnace, said chamber being so arranged that the flue gases are caused to pass downward through the filter before they are drawn into the fan, whereby the gases back up in front of the filter causing thereby a great increase of temperature in said chamber and heating the fire bricks to a high degree.

7. A device for producing hot air, comprising a furnace for heating air, a fan arranged next to said furnace, a chamber having a metallic bottom permeable to gas, a conduit effecting a communication between the combustion space of the furnace and said chamber, layers of small brick pieces of different size on said bottom, a layer of asbestos on said brick pieces, the layers of brick pieces and asbestos acting as a filter for the flue gases produced in the furnace, a mixing chamber arranged between said metallic bottom and the fan, and conduits supplying fresh air to the mixing chamber, the fresh air entering into the latter effecting at the same time a cooling of said metallic bottom, and said first mentioned members being so arranged that the flue gases are caused to pass downward through the filter before they are drawn into the fan.

8. A device for producing hot air, comprising a furnace for heating air, a fan arranged next to said furnace, a chamber having a bottom permeable to gas, filtering means on said bottom, a conduit connecting the combustion space of the furnace with said chamber, and adjustable pressure means adapted to exert a pressure upon the filtering means to press the latter tightly against the walls of said chamber which is so arranged that the flue gases produced in the furnace are caused to pass downward through the filtering means before they pass into the fan.

9. A device for producing hot air, comprising a furnace for heating air, a fan arranged next to said furnace, a chamber provided in the upper portion of said furnace, a conduit connecting the combustion space of the furnace to said chamber, a frame arranged within said chamber, a bottom permeable to gas resting on said frame, filtering means on said bottom, rails laid on the filtering means near the edges of the frame, and adjustable means for pressing the rails against the filtering means, said chamber being so arranged that the flue gases produced in the furnace are caused to pass downward through the filtering means before they are drawn into the fan.

10. The combination with a furnace, of a receptacle to receive the flue gases and dust therefrom, a filtering medium in the receptacle operating to back up the gases therein and thereby increase the temperature in the receptacle and highly heat the filtering medium, means to draw the gases through the latter, and means whereby the overheating of the receptacle by the filtering medium is prevented.

11. The combination with a furnace, of a receptacle to receive the flue gases and dust therefrom, a filtering medium in the receptacle operating to back up the gases therein and thereby increase the temperature in the receptacle and highly heat the filtering medium, means to draw the gases through the latter, and means including the last named means whereby a current of air is passed under the receptacle to reduce the temperature of the latter.

12. The combination with a furnace, of a receptacle, a filtering medium in the bottom thereof, means to admit flue gases and dust from the furnace into the receptacle above the filtering medium, means to admit fresh air beneath the bottom of the receptacle, a mixing chamber, and a suction device to draw air from beneath the receptacle and gas through the filtering medium into the mixing chamber, for the purpose specified.

In testimony that I claim the foregoing as my invention, I have signed my name.

JAKOB SCHLATTER.